(12) United States Patent
Li et al.

(10) Patent No.: US 11,282,270 B2
(45) Date of Patent: Mar. 22, 2022

(54) MULTI-STORY INDOOR STRUCTURED THREE-DIMENSIONAL MODELING METHOD AND SYSTEM

(71) Applicant: Wuhan University, Wuhan (CN)

(72) Inventors: Lin Li, Wuhan (CN); Fei Su, Wuhan (CN); Haihong Zhu, Wuhan (CN); Shen Ying, Wuhan (CN); Fan Yang, Wuhan (CN); Xinkai Zuo, Wuhan (CN); Yifan Liang, Wuhan (CN); Gang Zhou, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 176 days.

(21) Appl. No.: 16/854,937

(22) Filed: Apr. 22, 2020

(65) Prior Publication Data

US 2020/0364929 A1    Nov. 19, 2020

(30) Foreign Application Priority Data

May 13, 2019    (CN) .......................... 201910395243.2

(51) Int. Cl.
| | |
|---|---|
| *G06T 15/00* | (2011.01) |
| *G06T 17/05* | (2011.01) |
| *G06T 7/62* | (2017.01) |
| *G06T 7/11* | (2017.01) |
| *H04W 4/33* | (2018.01) |
| *G06F 17/16* | (2006.01) |

(52) U.S. Cl.
CPC .............. *G06T 17/05* (2013.01); *G06F 17/16* (2013.01); *G06T 7/11* (2017.01); *G06T 7/62* (2017.01); *H04W 4/33* (2018.02); *G06T 2207/10028* (2013.01); *G06T 2207/30184* (2013.01)

(58) Field of Classification Search
CPC ......... G06T 17/00; G06T 17/05; G06T 15/00; G06T 7/344
See application file for complete search history.

(56) References Cited

U.S. PATENT DOCUMENTS

| | | | |
|---|---|---|---|
| 2018/0275277 A1* | 9/2018 | Li | ............................ G01S 17/86 |
| 2019/0205485 A1* | 7/2019 | Rejeb Sfar | .............. G06T 17/00 |
| 2020/0202107 A1* | 6/2020 | Ozkucur | .............. G06K 9/4638 |

OTHER PUBLICATIONS

Peter Cheng, Avideh Zakhor, Ed., Texture Mapping 3D Models of Indoor Environments with Noisy Camera Poses (Year: 2013).*

* cited by examiner

*Primary Examiner* — Weiming He
(74) *Attorney, Agent, or Firm* — Matthias Scholl P.C.; Matthias Scholl (57) ABSTRACT

A method, including: 1) inputting a multi-story point cloud, and segmenting a story and an inter-story connection region based on an elevation histogram of the point cloud in a vertical direction; 2) segmenting rooms for each story based on a grid map projected onto an XOY plane respectively, wherein the XOY plane is parallel to a flooring; 3) segmenting indoor space cells for each story based on a vector wall line respectively; constructing a vector indoor plan based on superimposition of the vector and the grid for each story respectively; and 5) establishing a three-dimensional model of a multi-story structure by deleting an overlapping surface between the story and the connection region according to the Boolean intersection.

5 Claims, 11 Drawing Sheets

MULTI-STORY INDOOR STRUCTURED THREE-DIMENSIONAL MODELING METHOD AND SYSTEM

CROSS-REFERENCE TO RELATED APPLICATIONS

Pursuant to 35 U.S.C. § 119 and the Paris Convention Treaty, this application claims foreign priority to Chinese Patent Application No. 201910395243.2 filed May 13, 2019, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to the field of surveying and mapping of 3D geospatial information technology, and in particular to a multi-story indoor structured three-dimensional modeling based on point clouds.

Reconstructing three-dimensional indoor model entails large amounts of time and human resource. To accelerate data acquisition and improve the accuracy of the reconstructed model, many researchers have developed various sensor-based surveying technologies. Recent technological advances in 3D laser scanning allow for rapid capturing of a complex structure's geometry, which produces explicit 3D information in the form of high-density point clouds suitable for detailed 3D modeling. However, there are some issues with using the raw point cloud data for reconstructing 3D indoor environment. First, realistic building interiors are typically cluttered with furniture and other objects, which causing viewpoint occlusions resulting in missing sampling of the permanent structures, such as walls, ceilings and floors. Second, windows and other highly reflective surfaces are often present in the indoor scene. Third, the story segmentation in a multi-story environment show difficulties in the indoor scene. Thus, reconstructing indoor environment from these scanned point clouds is still in the early stage and this procedure is complicated under these conditions.

SUMMARY

The disclosure provides a structured three-dimensional modeling method.

The method comprises:
1) inputting a multi-story point cloud, and segmenting a story and an inter-story connection region based on an elevation histogram of the point cloud in a vertical direction;
2) segmenting rooms for each story based on a grid map projected onto an XOY plane respectively, wherein the XOY plane is parallel with the floor of the room;
3) segmenting indoor space cells for each story based on a vector wall line respectively, which comprises:
   3.1) slicing point cloud data of each separated story into a plurality of slices of point cloud according to a set number of slices;
   3.2) performing line segmentation for the point cloud slices based on a region growing algorithm, and performing line fitting by an iterative re-weighted least square method; calculating a direction vector of each line segment by projecting the fitted vector line onto the XOY plane;
   3.3) performing line fusion for all projected vector line segments, filtering out line segments with lengths smaller than a threshold, and fusing the collinear line segments into one-line segment; and
   3.4) extending all fused vector lines into straight lines, and dividing a space within the same story into vector polygonal cells through extended lines; according to a boundary range of a room segmentation graph, cutting a generated vector graph in the same boundary range to obtain a cut vector graph;
4) constructing a vector floor plan based on superimposition of the vector and the grid for each story respectively; and
5) establishing a three-dimensional model of a multi-story structure by deleting overlapping surfaces between the stories and the connection regions according to the Boolean intersection.

1) can comprise:
   1.1) forming the elevation histogram of point clouds in the vertical direction by performing statistical analyses on the point number of the raw data that is on a Z axis and within each elevation interval according to an input elevation interval (bin size); and
   1.2) obtaining peaks in the histogram and a trough region between two adjacent peaks according to the calculated histogram, wherein the trough region is the inter-story connection region when a height of the trough region is small than $h_{threshold}$, and $h_{threshold}$ represents a slab thickness of inter-story floor.

2) can comprise:
   2.1) projecting single-story point cloud onto the XOY plane, and discretizing the point cloud into a grid map according to input grid sizes, wherein a value of each grid refers to the number of points inside the grid; binarizing the grid map, wherein a space with a grid value greater than 1 in the map is marked as a passable space, and a space with a grid value being 0 is marked as an unpassable space;
   2.2) projecting the region between the door height to the wall height in each wall onto a two-dimensional plane, and converting this projection as an unpassable region; and
   2.3) obtaining the room segmentation grid map by performing morphological room segmentation in each story for the passable region generated in 2.2), wherein different label values are set for different rooms.

4) can comprise:
   4.1) generating a large number of random points and center point in each polygonal cell within a boundary range of the vector graph generated in 3.4), wherein all of the generated random points and center points constitute a point set, the label values (label) in the room segmentation graph are extracted by each point in the point set according to a position of each point;
   4.2) determining a value of each polygonal cell in the vector graph by the label value of the point within the range; and
   4.3) combining the polygonal cells with the same label value, and removing all cells with the label value being a non-room region to obtain an indoor plan and generate vector indoor plan data.

5) can comprise:
   5.1) for each story, using the vector floor plan generated in 4.3) respectively; for point cloud in each room, obtaining height in each room through the elevation histogram of point clouds along the vertical direction; according to the indoor plan, calculating and determining a closest set of wall surfaces between adjacent rooms, and marking a position of a door between two wall surfaces when two wall surfaces are parallel and a distance thereof does not exceed a wall thickness;

5.2) performing polygonal triangulation for a ceiling, the wall, the door and the flooring within each story by a constrained Delaunay triangulation method to construct the three-dimensional model of the room, and outputting the model in the form of vector mesh;

5.3) reconstructing the inter-story connection region by a Delaunay triangulation method and outputting the region in the form of vector mesh; and 5.4) placing all story models and inter-floor connection region models into a same model, detecting and deleting all intersection surfaces through the Boolean intersection to reconstruct a three-dimensional model of the multi-story indoor structure, and outputting a final result in the form of vector mesh.

The disclosure further provides a three-dimensional modeling method of multi-story indoor structure based on laser point clouds for executing the above method.

The disclosure has the following beneficial effects: an effective technical solution of reconstructing a multi-story indoor three-dimensional model is provided to enhance an effect of establishing a three-dimensional model of multi-story indoor structure based on point clouds and ensure an accuracy of partial modeling of an indoor long corridor. Rapid reconstruction of the indoor three-dimensional model based on point clouds has always been a research hotspot, and indoor space division and multi-story indoor structure reconstruction are always research difficulties. In the disclosure, the original multi-story indoor structure reconstruction problem is divided into a single-story indoor reconstruction problem and an inter-story connection space reconstruction problem by a story segmentation method. Then, the disclosure converts the original single-story indoor reconstruction problem into an indoor plan reconstruction problem by fully utilizing structural characteristics of the indoor space, and performs division for the single-story indoor space by a room segmentation method, thereby solving the single-story indoor plan reconstruction problem. The indoor model of a multi-story building may be rapidly and efficiently constructed by means of "segmentation before local reconstruction", and may be used for indoor locating and indoor mapping, and the like.

DETAILED DESCRIPTION OF THE EMBODIMENTS

To help those skilled in the art to understand and implement the disclosure, the disclosure will be further described in detail below in combination with accompanying drawings and examples. It is to be understood that the examples described herein are only used to describe and explain the disclosure rather than limit the disclosure.

Performing indoor scenario reconstruction based on point cloud has always been a research hotspot, and indoor space division and multi-story indoor structure reconstruction are always research difficulties of point cloud modeling.

In this background, the disclosure provides a method of establishing a three-dimensional model of multi-story indoor structure. By a story segmentation method, which has been clarified in block 1, and a room segmentation method, which will be clarified in block 2-4, a multi-story model reconstruction problem is converted into a multi-story division problem and a single-story plan reconstruction problem, that is, a single-story indoor reconstruction problem and an inter-story connection space reconstruction problem. Reconstruction of a multi-story indoor three-dimensional model based on story segmentation and room segmentation is realized by means of relevant achievements in the fields of artificial intelligence and building information modeling. Generally, an indoor ceiling and an indoor flooring are both horizontal, and all walls are vertical. A room is a closed region surrounded by the walls, the ceiling and the floorings, and the rooms (including corridors) are connected by a door on the wall. In the histogram that describes the distribution of points along the gravity direction (i.e., Z-axis), the horizontal structure presents a peak, and the non-horizontal structure presents a trough. Thus, the ceiling and the flooring are visible as peaks in the point distribution histogram along gravity vector. Since an inter-story connection region is disposed between a ceiling of a low story and a flooring of a high story and very few horizontal structures exist in the inter-story connection region, the inter-story connection region often presents the trough. Each story and the inter-story connection region between two story may be extracted through a "peak-trough-peak" strategy. A room space is a closed region, but the door breaks such closure resulting in a poor effect of performing room segmentation for each story. Therefore, the connection between the rooms is cut off by projecting an offset region between a door height and a wall height onto the XOY plane as boundaries to increase an accuracy of a room segmentation graph. An indoor plan of each story is obtained by superimposing polygonal cells divided by wall lines and the room segmentation graph, while considering a division accuracy of the room space and a geometric accuracy of the structure in the room. Finally, reconstruction of an inner-surface model of a multi-story indoor structure is completed by deleting an intersection surface of the story and the inter-story connection region based on the Boolean intersection.

The ceiling and the flooring input into the point cloud data are horizontal, and the wall is perpendicular to the ceiling and the flooring. The XOY plane according to the disclosure remains parallel to the flooring, and the Z axis refers to a coordinate axis perpendicular to the XOY plane.

Figure 1:
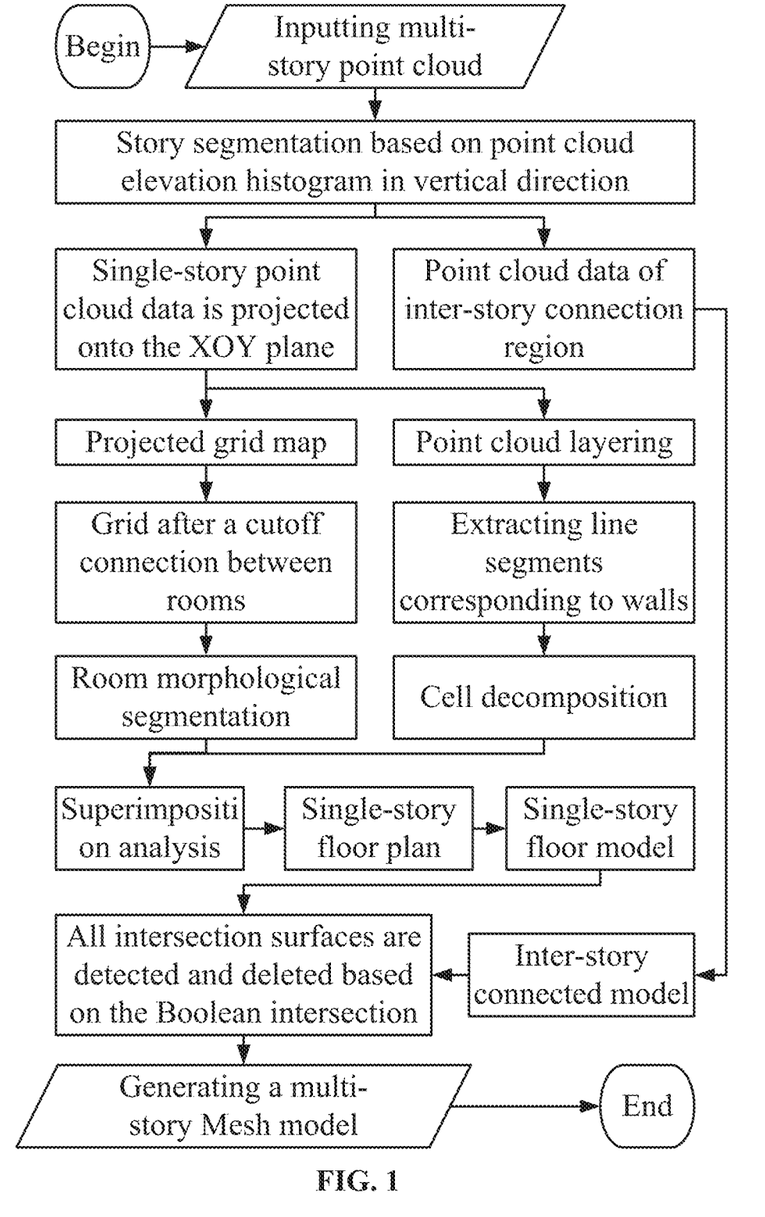
FIG. 1 is a flowchart of a method of establishing an indoor three-dimensional model of a building according to one embodiment of the disclosure.

As shown in FIG. 1, a multi-story indoor structured three-dimensional modeling method based on laser point cloud includes the following blocks.

At block 1, after multi-story point cloud is input, segmentation of stories and inter-story connection regions (Story Segmentation) is firstly performed based on the point cloud elevation histogram in a vertical direction, which includes the following sub-blocks.

At sub-block 1.1, the point cloud elevation histogram in the vertical direction is formed by performing statistics for a point number of the point cloud data that is on the Z axis and within each elevation interval according to a size (bin size) of the input elevation interval. The bin size may be preset, and a value thereof is preferably around 5-10 cm representing the elevation interval of the elevation histogram.

At sub-block 1.2, peaks in the histogram and a trough region between two adjacent peaks are obtained according to the calculated histogram. If a height of the trough region is $h < h_{threshold}$, the trough region is the inter-story connection region; otherwise, the trough region is not the inter-story connection region. $h_{threshold}$ represents a slab thickness of inter-story floor (for example, a thickness from the ceiling of a first story to the flooring of a second story) which is usually within a range of 0.2-1 m. All inter-story connection regions are separated through such "peak-trough-peak" strategy, and each remaining story is separated at the same time.

Subsequently, according to the point cloud after story segmentation, blocks 2, 3, 4, 5.1 and 5.2 are performed for each story sequentially and respectively, and block 5.3 is directly performed for the inter-story connection region.

At block 2, single-story room segmentation (Room-Space Segmentation) is performed for each story based on a grid map projected onto an XOY plane respectively, which includes the following sub-blocks.

At sub-block 2.1, single-story point cloud is projected onto the XOY plane, and then, the point cloud is discretized into a grid map according to the input grid size, where a value of each grid refers to the number of points inside the grid. If no point is included in the grid, the grid is marked black. The grid color closer to white represents more points within the grid. Then, the grid map is binarized, a space with a grid value greater than 1 in the map is marked as a passable space, and a space with a grid value being 0 is marked as an unpassable space, as shown in FIG. 2.

Figure 2:
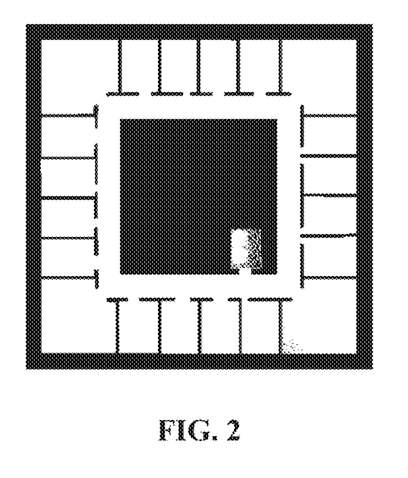
FIG. 2 is a grid map after projecting a single-story point cloud onto an XOY plane. The color is black if the pixel does not contain points. A pixel is colored white if it contains no less than one point.
Figure 3:
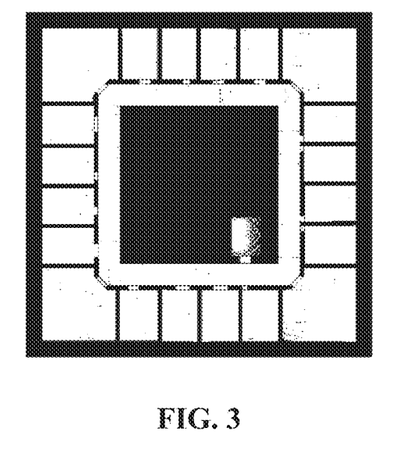
FIG. 3 is a grid map generated after an offset region between a door height and a wall height is projected onto an XOY plane according to one embodiment of the disclosure.

At sub-block 2.2, the room is a closed region surrounded by the wall, the ceiling and the flooring, but the door breaks such closure, resulting in a poor effect of directly performing room segmentation for the grid map of each story (as shown in FIG. 2). Further, there is usually a case of under-segmentation in which the room and the corridor are not separated. Therefore, an indoor three-dimensional model established in the above case is often unreliable. If each room region is closed, the above problems are greatly reduced. To increase the accuracy of room-space segmentation, the region from the door height to the wall height is projected onto a two-dimensional plane and converted into an unpassable region (the grid value is 0), that is, a connection between the rooms is blocked. The improved grid map is as shown in FIG. 3. It can be seen from FIG. 2 that there is an opening between the room and the corridor. In FIG. 3, the grid of the opening is changed from white to black, thereby facilitating room segmentation.

At sub-block 2.3, a single-story grid room segmentation graph is obtained by performing morphological room segmentation method on the passable region generated at sub-block 2.2. The room segmentation result is as shown in FIG. 3. In a specific implementation, different rooms may be distinguishingly displayed by different colors, and different colors correspond to different label values, that is, a different label value (label) is set for each room.

Figure 4:
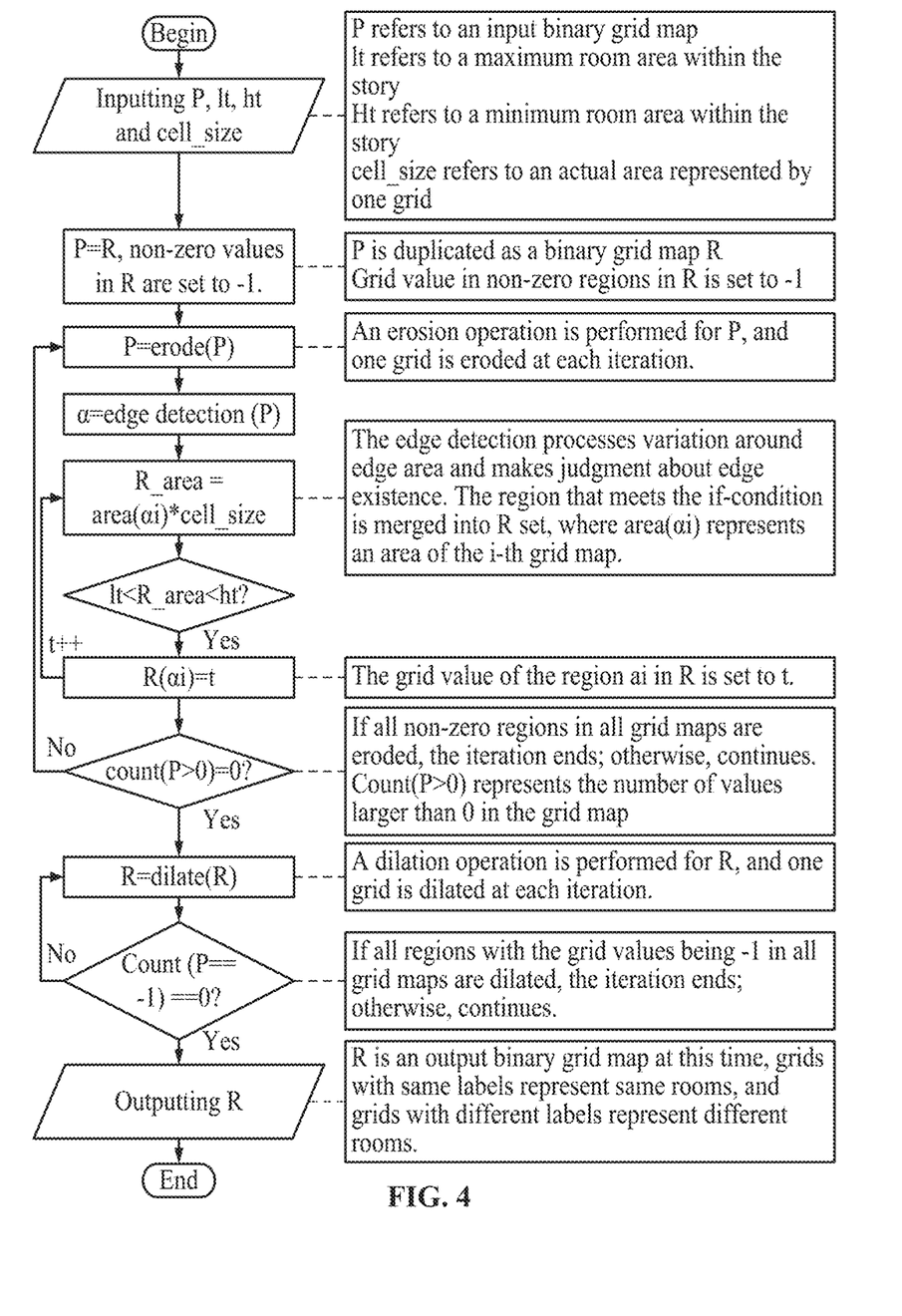
FIG. 4 is a flowchart illustrating a morphological room segmentation method according to one embodiment of the disclosure.
Figure 5:
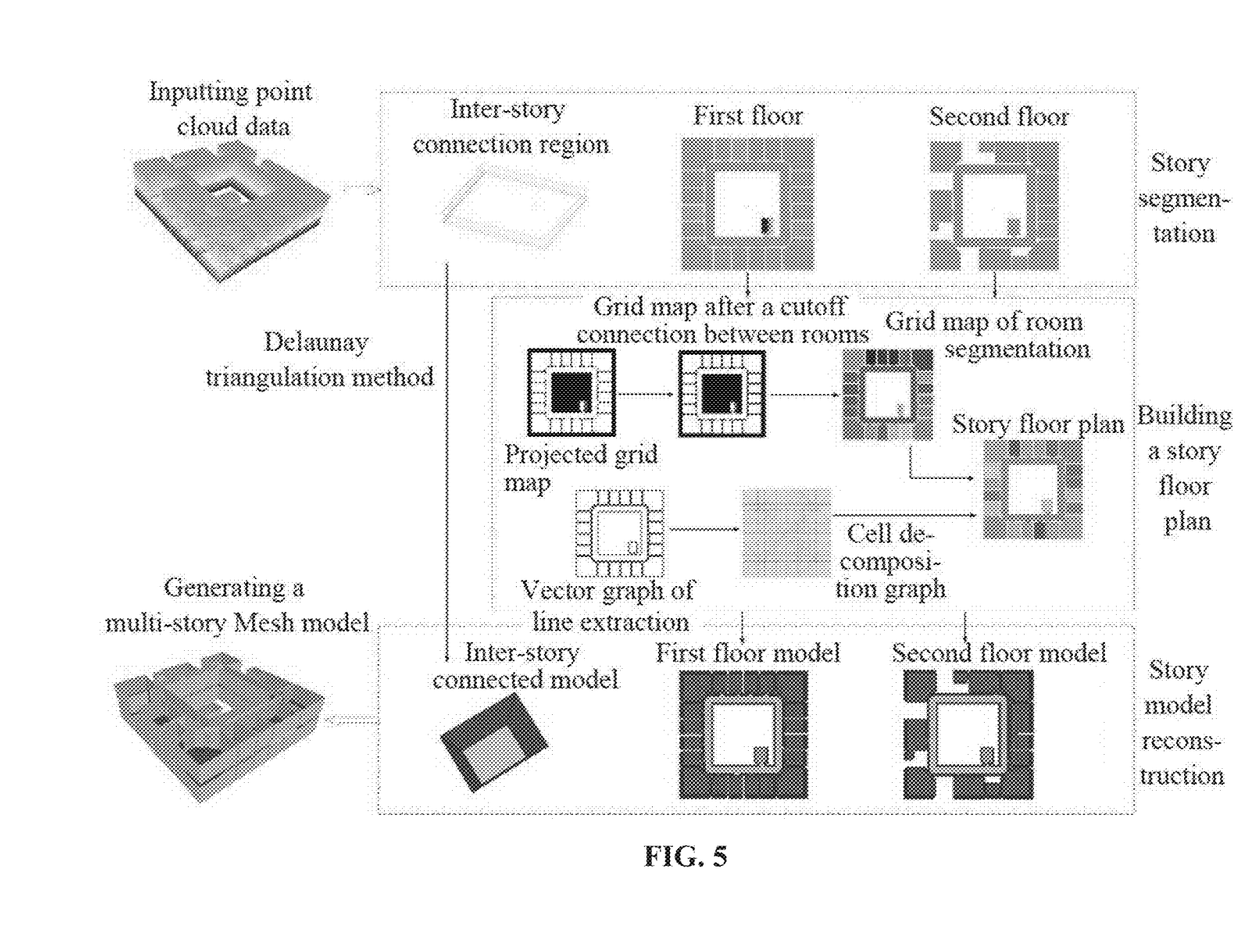
FIG. 5 is a flowchart illustrating 3d indoor interior reconstruction.
Figure 6A:
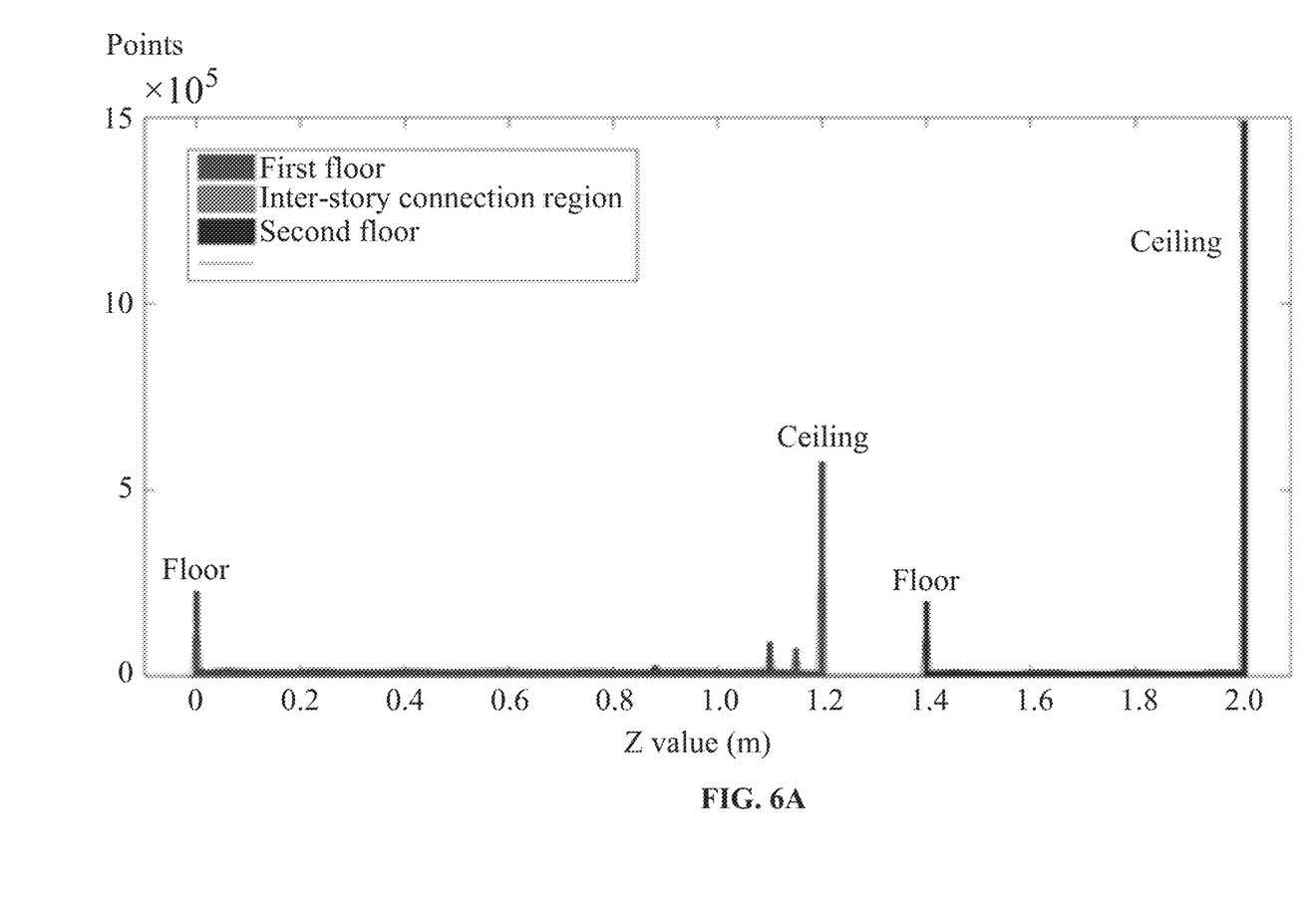
FIG. 6A presents point distribution along the z-axis.
Figure 6B:
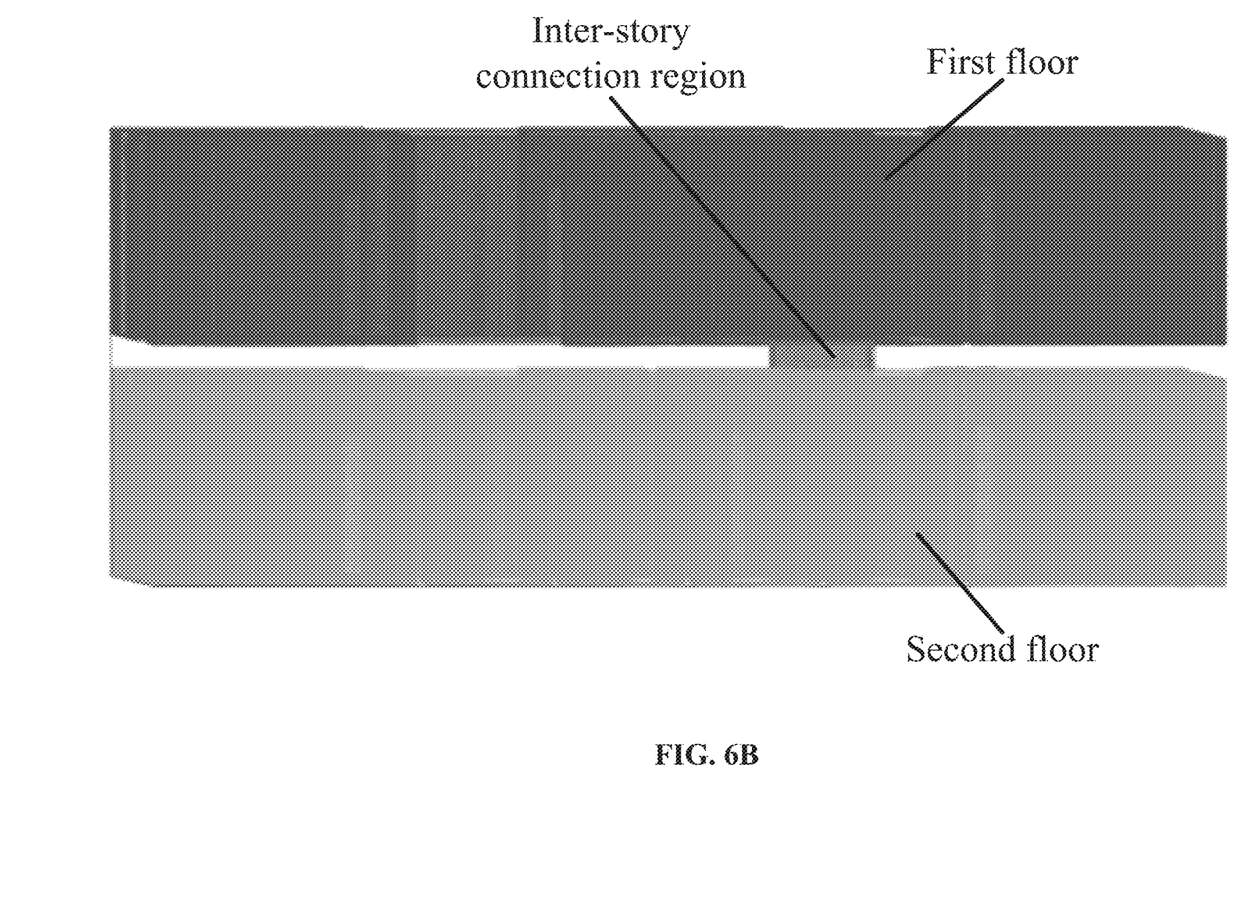
FIG. 6B is the result after story segmentation section (which is illuminated in section 1), one color per story.
Figure 7A:
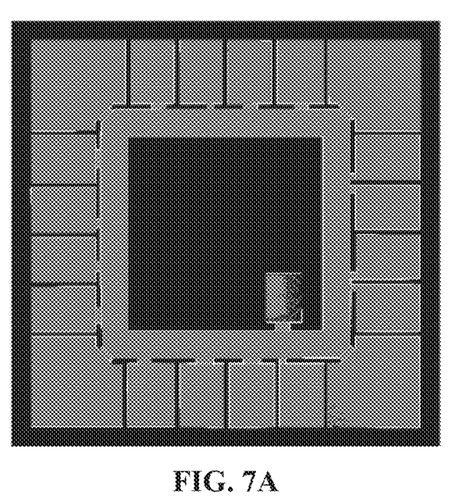
FIG. 7A is a grid map generated after projected point cloud onto an XOY plane.
Figure 7B:
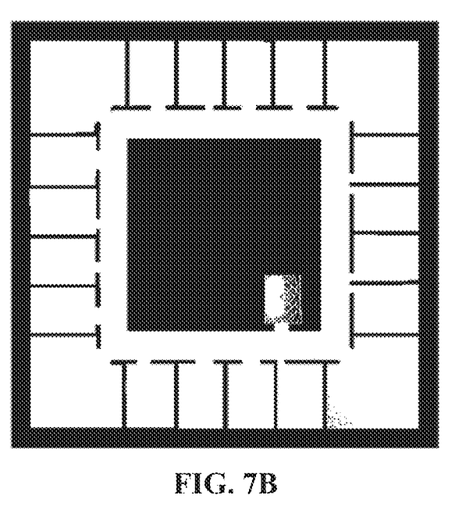
FIG. 7B is a binarized grid map, which colored a pixel with no less than one point as white.
Figure 8:
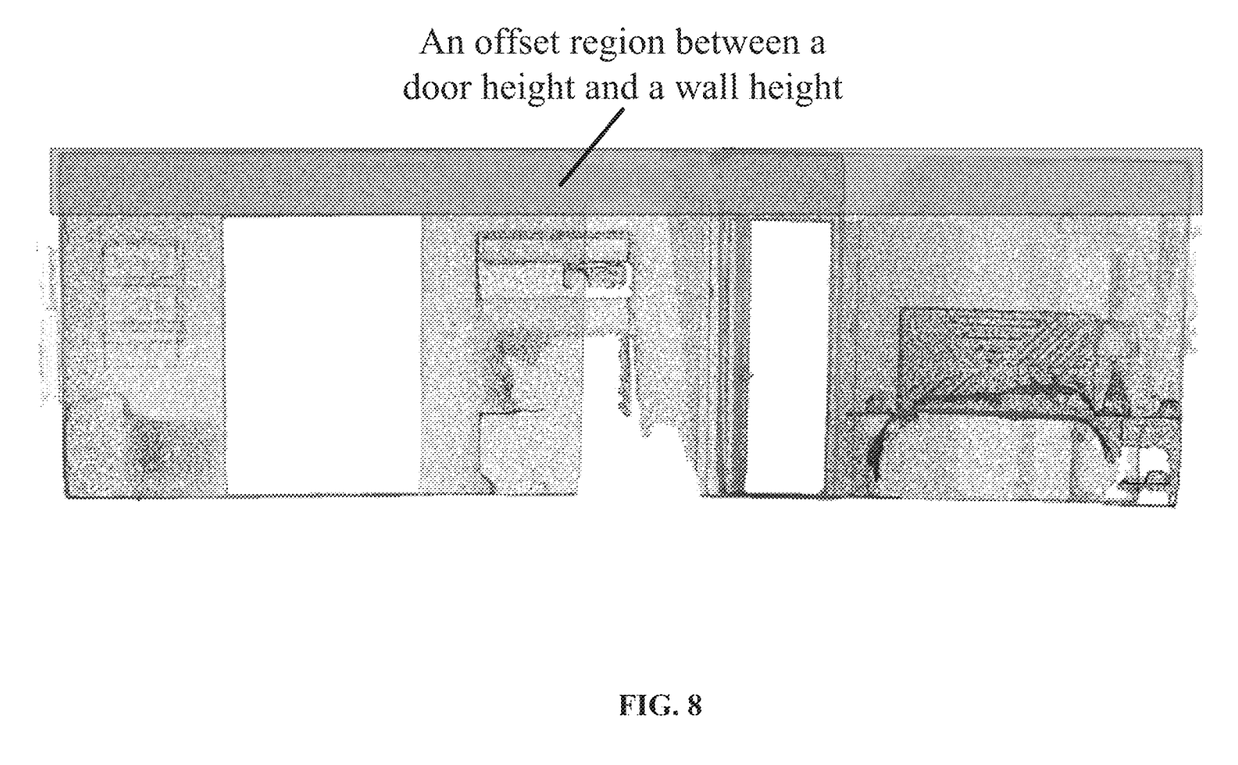
FIG. 8 is schematic diagram for the offset space in one wall.
Figure 9A:
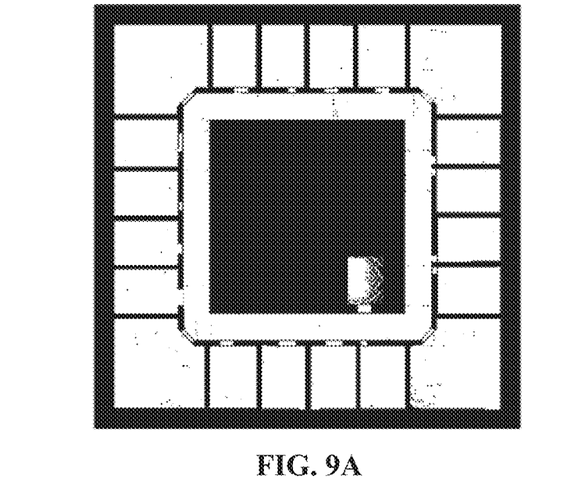
FIG. 9A is a grid map generated after an offset region between a door height and a wall height is projected onto an XOY plane according to one embodiment of the disclosure.
Figure 9B:
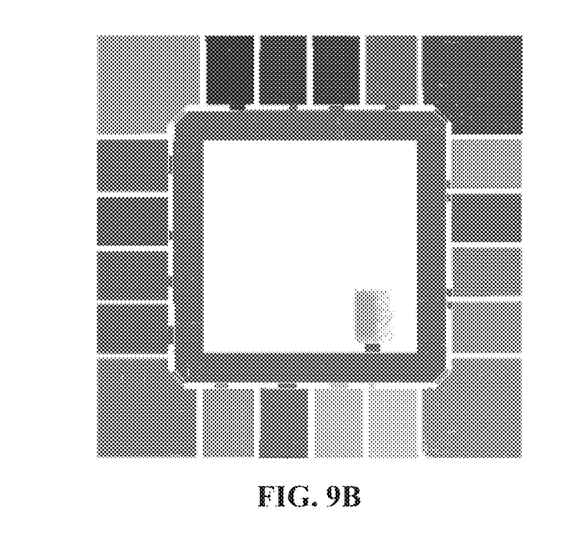
FIG. 9B is a grid map generated after room space segmentation (which is illuminated in Section 2).
Figure 10A:
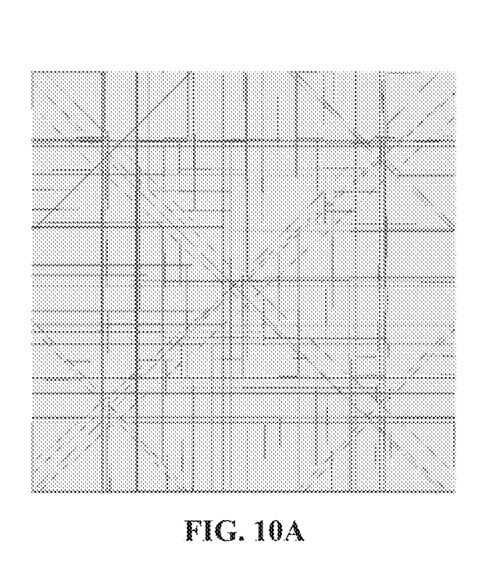
FIG. 10A is the indoor space cells created by wall line.
Figure 10B:
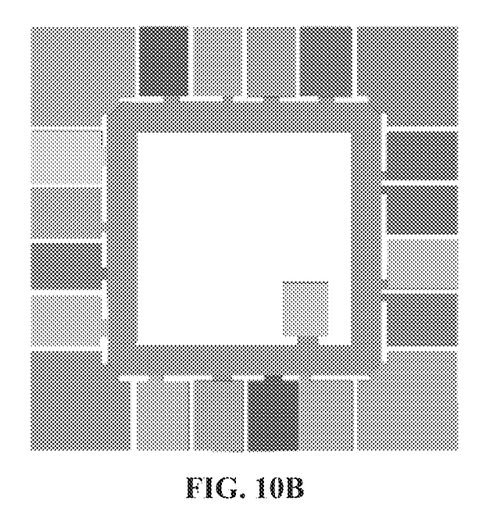
FIG. 10B is final floor plan created by Section 4.
Figure 11A:
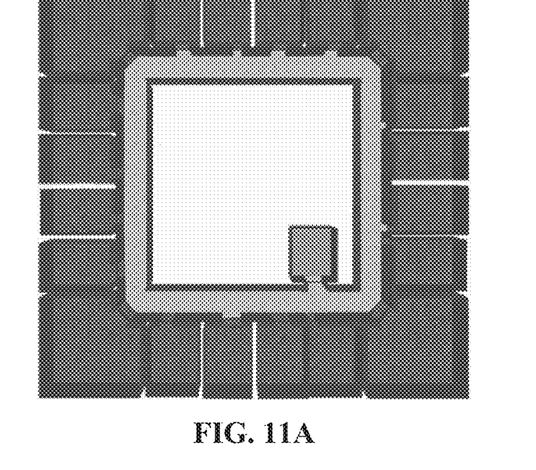
FIG. 11A is atop view of the final 3d reconstructed model.
Figure 11B:
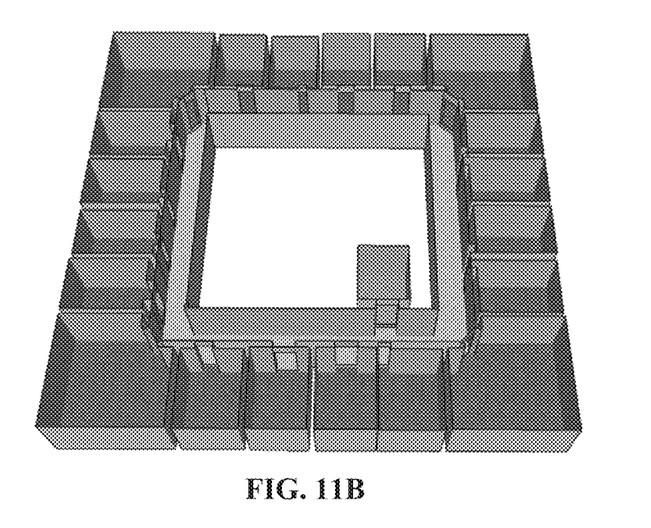
FIG. 11B is an oblique view of the final 3d reconstructed model.

A flowchart of the morphological segmentation method adopted in the examples is as shown in FIG. 4.

1) P, lt, ht and cell_size are input, where P refers to an input binary grid map, lt refers to a maximum room area within the story, ht refers to a minimum room area within the story, and cell_size refers to an actual area represented by one grid.

2) P is duplicated as a binary grid map R, and a grid value of a non-zero region in R is set to −1.

3) An erosion operation is performed for P and denoted as P=erode(P), and each iteration erodes one grid.

4) Each region separated after the erosion of the grid map is detected based on edge detection, a detection result is denoted as a=edge detection (P), and ai may be used to indicate a separated i-th region.

5) An area within each region in the edge detection is calculated based on the formula of R_area=area(ai)* cell_size, where area(ai) refers to an area of ai in the grid map, and R_area refers to an actual area of ai.

6) If R_area satisfies lt<R_area<ht, the grid value of the region ai in R is set to t, and t is initially set to 1, that is, R(ai)=t.

7) t++ is set, that is, let t=t+1, and block 5) is performed until block 5) and block 6) are performed for all separated regions, and then, block 8) is performed.

8) If all non-zero regions in all grid maps are eroded, that is, count (P>0)==0, and count( ) refers to the number of satisfactory values in the grid map, the iteration is ended to perform block 9); otherwise, a return is made to block 3) to continue iteration.

9) A dilation operation is performed for R and denoted as P=dilate(P), and one grid is dilated for each iteration.

10) If all regions with the grid values being −1 in all grid maps are dilated, that is, count (P==−1)==0, the iteration is ended to perform block 11); otherwise, a return is made to block 9) to continue the iteration.

11) R is output, where R is an output binary grid map at this time, grids with same labels represent same rooms, and grids with different labels represent different rooms.

The above morphological segmentation method has the following advantages: 1. parameters selected by the method are simple and more convenient to use than those in other room segmentation methods; 2. The method is used in the passable region simplified at sub-block 2.2 so that the completeness of the long corridors and large-area rooms in the building may be maintained; 3. the method is simple in implementation and high in efficiency.

At block 3, single-story indoor space cell decomposition (Cell Decomposition) is performed for each story based on a vector wall line respectively, which includes the following sub-blocks.

At sub-block 3.1, point cloud in each separated story is sliced into a plurality of slices according to the set number of slices $num_{slice}$. Sub-block 3.2 is performed for each point cloud slice. Slicing the story point cloud may ensure that the wall lines may be extracted comprehensively as possible within the story. $num_{slice}$ is affected by an input single story height and an input point cloud density, and thus, the $num_{slice}$ should ensure that the sliced point cloud has sufficient points to perform sub-block 3.2. Generally, if the input point cloud densities are relatively uniform and the single-story building height is around 2 m, $num_{slice}$ may be selected between 7 and 12.

At sub-block 3.2, line segmentation is performed for each point cloud slice based on a region growing algorithm, and line fitting is performed by an iterative re-weighted least square method; the fitted vector lines are projected onto the XOY plane to calculate a direction vector n of each line segment.

At sub-block 3.3, line fusion is performed for all projected vector line segments to filter out line segments with lengths smaller than a threshold and fuse the collinear line segments into one-line segment.

If direction vectors corresponding to adjacent line segments $l_p$ and $l_s$ are $n_p$ and $n_s$ respectively and comply with $\|n_p \cdot n_s\| > \cos(\theta_{th})$ and $dis_{(p,s)} \leq dis_{th}$, a circumscribed rectangle of $l_p$ and $l_s$ is obtained, and $l_p$ and $l_s$ are fused into one-line segment according to the circumscribed rectangle. A vector line layer after line fusion is obtained.

In the above formula, $\|n_p - n_s\|$ refers to a cosine value of an included angle of direction vectors, and $\theta_{th}$ refers to a threshold of the included angle of the direction vectors of two line segments $l_p$ and $l_s$. If the included angle between two-line segments is smaller than the threshold $\theta_{th}$, two-line segments are parallel. The default value of threshold $\theta_{th}$ is 1°-2°.

In the above formula, $dis_{(p,s)}$ refers to a Euclidean distance between two-line segments, and $dis_{th}$ refers to a threshold of the Euclidean distance between two-line segments. If two-line segments are parallel and the Euclidean distance between two-line segments is smaller than or equal to the threshold, it is considered that two-line segments may be fused. A value of $dis_{th}$ is affected by a wall thickness in the room and is substantially same as the wall thickness, and the value is usually selected as around 0.05-0.2 m.

At sub-block 3.4, all fused vector lines are extended into straight lines, a space within the same story is divided into vector polygonal cells through extension lines; according to a boundary range of the room segmentation graph generated at sub-block 2.3, a generated vector graph is cut in the same boundary range to obtain a cut vector graph.

At block 4, construction of a vector indoor plan based on superimposition of the vector and the grid (FloorPlanReconstruction) is performed for each story respectively in the following sub-blocks.

At sub-block 4.1, a large number of random points and center point in each polygonal cell are generated within a boundary range of the vector graph generated at sub-block 3.4, all of the generated random points and center points constitute a point set, the label values (label) in the room segmentation graph generated at sub-block 2.3 are extracted by each point in the point set according to a position of each point, and a set of the label values is $\Omega_{label}$. The number of random points is affected by an area of a story plane. It is generally ensured that at least 20 points exist within each square meter. For example, if the indoor area within the single story is 200 m², the number of random points is at least 200*20=4000.

At sub-block 4.2, a value of each polygonal cell in the vector graph is determined by the label value of the point within its range. For the polygonal cell $Cell_{x,y}$, the number $num_t$ of the point of which the label value (label) is t within the $Cell_{x,y}$ is firstly calculated. Therefore, the label value of the $Cell_{x,y}$ is calculated as follows:

$$label_{cell}^{x,y} = t \text{ if } num_t = \max\{num_{\forall i \in \Omega_{label}}\}, t \in \Omega_{label}.$$

In the above formula, $label_{cell}^{x,y}$ refers to the label values within the $Cell_{x,y}$, $\Omega_{label}$ refers to a set of the label values, which describes all labels in the vector graph, that is, all room labels, and $\max\{num_{\forall i \in \Omega_{label}}\}$ refers to a maximum value of the number of points having the same label value in the $Cell_{x,y}$. If the number of points with the label being t is the largest within the $Cell_{x,y}$, $label_{cell}^{x,y}$ is set to t.

If neighbors $Cell_{nei}$ of the polygonal cell $Cell_{x,y}$ all have other label values, $$label_{cell}^{x,y} = t \text{ if } label_{cell}^{nei} = t, t \in \Omega_{label}.$$

In the above formula, $label_{cell}^{x,y}$ refers to the label value of the neighbor $Cell_{nei}$ of the $Cell_{x,y}$. The neighbors of the $Cell_{x,y}$ refer to eight neighbors, that is, $Cell_{x-1,y-1}$, $Cell_{x-1,y}$, $Cell_{x-1,y+1}$, $Cell_{x,y-1}$, $Cell_{x,y}$, $Cell_{x,y+1}$, $Cell_{x+1,y-1}$, $Cell_{x+1,y}$ and $Cell_{x+1,y+1}$. If the labels of eight neighbors $Cell_{nei}$ of the $Cell_{x,y}$ are all t, $label_{cell}^{x,y}$ is set to t.

At sub-block 4.3, the polygonal cells with the same label value are combined, and all cells with the label value being a non-mom region (generally 0) are removed to obtain an indoor plan and generate vector indoor plan data.

At block 5, a multi-story three-dimensional model is established (Indoor Interior Reconstruction) by deleting an overlapping surface between the story and the connection region according to the Boolean intersection, which includes the following sub-blocks.

At sub-block 5.1, for each story, the vector indoor plan data generated at sub-block 4.3 is used respectively; for the point cloud data in each room region, a height of each room is obtained through the point cloud elevation histogram in the vertical direction. According to the indoor plan, a closest wall between adjacent rooms is calculated. A position of the door is marked between two walls if the two walls are parallel and a distance thereof does not exceed the wall thickness.

At sub-block 5.2, for each story, polygonal triangulation is performed for the ceiling, the wall, the door and the flooring within the story by a constrained Delaunay triangulation method to construct a final three-dimensional model of the room and output the model in the form of vector mesh.

At sub-block 5.3, the inter-story connection region is reconstructed by a Delaunay triangulation method and output in the form of vector mesh.

At sub-block 5.4, all story models and inter-story connection region models are placed into a same model, and all intersection surfaces are detected and deleted based on the Boolean intersection. In this way, the reconstruction of the multi-story indoor three-dimensional model is completed, and a final result is output in the form of vector mesh. The final indoor model of the multi-story building may be used for indoor locating, indoor mapping, and the like.

In a specific implementation, the above method may be automatically operated by adopting a computer software technology, and a system and an apparatus for operating the method of the disclosure shall also be encompassed in the scope of protection of the disclosure.

It will be obvious to those skilled in the art that changes and modifications may be made, and therefore, the aim in the appended claims is to cover all such changes and modifications.

What is claimed is:

1. A method, the method comprising:
   1) inputting a multi-story point cloud into a computer, and segmenting multiple stories and inter-story connection region sandwiched between two stories based on the histogram that describes the distribution of points along the gravity direction (z-axis), the histogram is created in computer;
   2) segmenting rooms for each story based on a grid map projected onto an XOY plane respectively in a computer;
   3) partitioning indoor space cells for each story based on a vector wall line respectively in a computer, which comprises:
      3.1) slicing point cloud data of each separated story along the z-axis into a plurality of slices of point cloud data according to a set number of slices;
      3.2) performing line segmentation for the point cloud slices based on a region growing algorithm, and performing line fitting by an iterative re-weighted least square method; calculating a direction vector of each line segment by projecting the fitted vector line onto the XOY plane;
      3.3) performing line fusion for all projected vector line segments, filtering out line segments with lengths smaller than a threshold, and fusing the collinear line segments into one-line segment; and
      3.4) extending all fused vector lines into straight lines, and dividing a space within the same story into vector polygonal cells through extension lines; according to a boundary range of a room segmentation graph, cutting a generated vector graph in the same boundary range to obtain a cut vector graph;
   4) constructing a vector indoor plan based on superimposition of the vector and the grid for each story respectively; and
   5) reconstructing the final three-dimensional model of a multi-story structure in a computer by deleting an overlapping surface between the stories and the connection regions according to the Boolean intersection.

2. The method of claim 1, wherein 1) comprises:
   1.1) forming the elevation histogram of point clouds in the vertical direction by performing statistical analyses on the point number of the raw data that is on a Z axis and within each elevation interval according to an input elevation interval; and
   1.2) obtaining peaks in the histogram and a trough region between two adjacent peaks according to the calculated histogram, wherein the trough region is the inter-story connection region when a height of the trough region is small than $h_{threshold}$, and $h_{threshold}$ represents a slab thickness of inter-story floor.

3. The method of claim 1, wherein 2) comprises:
   2.1) projecting single-story point cloud data onto the XOY plane, and discretizing the point cloud into a mesh according to input grid sizes, wherein a value of each grid refers to the number of points inside the grid; binarizing the grid map, wherein a space with a grid value greater than 1 in the map is marked as a passable space, and a space with a grid value being 0 is marked as an unpassable space;
   2.2) projecting a region between a door height to a wall height onto a two-dimensional plane, and converting the region into an unpassable region; and
   2.3) obtaining a single-story grid room segmentation graph by performing indoor room segmentation for the passable region generated in 2.2) by a morphological room segmentation method, wherein different label values are set for different rooms.

4. The method of claim 3, wherein 4) comprises:
   4.1) generating a large number of random points and different vector polygonal cell center points within a boundary range of the vector graph generated in 3.4), wherein all of the generated random points and center points constitute a point set, the label values in the room segmentation graph are extracted by each point in the point set according to a position of each point;
   4.2) determining a value of each polygonal cell in the vector graph by the label value of the point within the range; and
   4.3) combining the polygonal cells with the same label value, and removing all cells with the label value being a non-room region to obtain an indoor plan and generate vector indoor plan data.

5. The method of claim 4, wherein 5) comprises:
   5.1) for each story, using the vector indoor plan data generated in 4.3) respectively; for the point cloud data in each room region, obtaining a height of each room through the elevation histogram of point clouds in the vertical direction; according to the indoor plan, calculating and determining a closest set of wall surfaces between adjacent rooms, and marking a position of a door between two wall surfaces when two wall surfaces are parallel and a distance thereof does not exceed a wall thickness;
   5.2) performing polygonal triangulation for a ceiling, the wall, the door and the flooring within each story by a constrained Delaunay triangulation method to construct a final three-dimensional model of the room, and outputting the model in the form of vector mesh;
   5.3) reconstructing the inter-story connection region by a Delaunay triangulation method and outputting the region in the form of vector mesh; and
   5.4) placing all story models and inter-floor connection region models into a same model, detecting and deleting all intersection surfaces through the Boolean intersection to reconstruct a three-dimensional model of the multi-story indoor structure, and outputting a final result in the form of vector mesh.

* * * * *